United States Patent
Eberlein et al.

(10) Patent No.: US 11,119,883 B1
(45) Date of Patent: Sep. 14, 2021

(54) SIMULATING EVENT INTERDEPENDENCIES IN SERVICE MESHES EXTENDED BY EVENT-DRIVEN APPLICATIONS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/030,607

(22) Filed: Sep. 24, 2020

(51) Int. Cl.
*G06F 11/34* (2006.01)
*G06F 11/32* (2006.01)
*G06F 11/30* (2006.01)

(52) U.S. Cl.
CPC ........ *G06F 11/3457* (2013.01); *G06F 11/302* (2013.01); *G06F 11/3006* (2013.01); *G06F 11/323* (2013.01); *G06F 11/324* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 2014/0208296 A1* | 7/2014 | Dang | ...................... | G06F 8/751 717/123 |
| 2015/0128156 A1* | 5/2015 | Zhu | ...................... | G06F 11/302 719/328 |
| 2016/0050161 A1* | 2/2016 | Da | ...................... | H04L 45/00 709/226 |
| 2021/0021643 A1* | 1/2021 | Nakagoe | ............... | H04L 63/102 |

OTHER PUBLICATIONS

Github.com [online], "TG 27—Business Events", available on or before Sep. 20, 2020, [retrieved on Sep. 20, 2020], retrieved from: URL <https://github.tools.sap/CentralEngineering/TechnologyGuidelines/tree/latest/tg27>, 7 pages.
Github.com [online], "Business Event Bus", available on or before Sep. 20, 2020, [retrieved on Sep. 20, 2020], retrieved from: URL <https://pages.github.tools.sap/kernelservices/services/business-event-bus>, 7 pages.

* cited by examiner

*Primary Examiner* — Qing Chen
(74) *Attorney, Agent, or Firm* — Fish & Richardson P.C.

(57) ABSTRACT

Methods, systems, and computer-readable storage media for generating a call graph representative of a service mesh including software systems and extension applications, the software systems including a first software system that is configured to publish a first event and a second software system configured to receive first API calls, the extension applications including a first extension application configured to consume the first event and, in response to the first event, transmit first API calls, determining a first cardinality representative of a ratio of first events to first API-calls, receiving monitoring data representative of frequencies of the first event occurring during production use of the first software system, simulating production use of the service mesh by generating a set of frequencies of first API calls based on the call graph, the monitoring data, and the first cardinality, and displaying simulation results including the set of frequencies of the first API calls.

20 Claims, 8 Drawing Sheets

| Measurement | E1 Freq'y | Cardinality E1 : API-1 | API-1 Freq'y | Cardinality API-1 : E2 | E2 Freq'y | Cardinality E2 : API-2 | API-2 Freq'y |
|---|---|---|---|---|---|---|---|
| Avg | 11 | 2.10 | | 3.20 | | 2.80 | |
| Peak | 120 | 2.10 | | 10.60 | | 3.50 | |
| Simulation [1/h] | E1 Freq'y | Simulation | API-1 Freq'y | | E2 Freq'y | | API-2 Freq'y |
| Avg | 11 | → | 23.10 | → | 73.92 | → | 206.98 |
| Peak | 120 | → | 252.00 | → | 2671.20 | → | 9349.20 |

SIMULATING EVENT INTERDEPENDENCIES IN SERVICE MESHES EXTENDED BY EVENT-DRIVEN APPLICATIONS

BACKGROUND

Modern software systems provided as a service (i.e., in a Software-as-a-Service (SaaS) approach) typically offer extensibility approaches that are stable over the lifecycle of the software system. For example, a software vendor that provides a software system can enable developers (e.g., customers of the software system) to provide extension applications that provide further functionality. In one variant, a software system can publish events and an extension application can consume the event and execute functionality based thereon. In this example, the extension applications can be referred to as event-driven extensions. Such extension applications can call application programming interfaces (APIs) in the originating software system (i.e., the software system publishing an event) as well as other services (e.g., other extension applications), and can generate events themselves. This can result in a cascade of initiated actions across multiple software systems and extension applications. Typically, the cascaded actions are hard to overlook, especially if multiple extension applications are combined, as they depend on data not accessible to the developers of the extension applications.

In general, it is important for developers of extension applications to have an understanding of the performance impact and costs the functionality provided by an extension application will have in production use. This understanding can enable the developer to develop the extension application in a way that avoids adverse performance impact and costs (e.g., in terms of technical resources expended) when the extension application is deployed for production use.

SUMMARY

Implementations of the present disclosure are directed to a simulation platform to simulate and evaluate impacts of event-driven extensions in software systems. More particularly, implementations of the present disclosure are directed to a simulation platform that simulate impacts of event-driven extensions, which initiate cascading actions through application programming interface (API) calls across multiple software systems. In some implementations, the simulation platform processes event data and API monitoring data in combination with application process models and actual production data to generate and provide simulation results.

In some implementations, actions include generating, by a simulation platform of a development environment, a call graph at least partially representative of a service mesh including a set of software systems and a set of extension applications, the set of software systems including a first software system that is configured to publish a first event and a second software system configured to receive a set of first API calls, the set of extension applications including a first extension application configured to consume the first event and, in response to the first event, transmit the set of first API calls, determining, by the simulation platform, a first cardinality representative of a ratio of first events to first API-calls in the set of first API calls, receiving, by the simulation platform, monitoring data representative of one or more frequencies of the first event occurring during production use of the first software system, simulating, by the simulation platform, production use of the service mesh at least partially by generating a set of frequencies of first API calls based on the call graph, the monitoring data, and the first cardinality, and displaying simulation results at least partially including the set of frequencies of the first API calls. Other implementations of this aspect include corresponding systems, apparatus, and computer programs, configured to perform the actions of the methods, encoded on computer storage devices.

These and other implementations can each optionally include one or more of the following features: actions further include determining model information of the second software system, the model information including a cardinality of the second software system and being representative of a ratio of second events published by the second software system to first API calls received by the second software system during production use of the second software system, wherein simulating, by the simulation platform, production use of the service mesh further includes generating a set of frequencies of second events based on the call graph, the monitoring data, and the second cardinality; actions further include monitoring, during production use, events published by and API calls received by one or more of the first software system and the second software system, and generating the monitoring data based on the events and the API calls for use in simulations; events are monitored by an event monitoring system including one or more of an event bus and an event monitoring module, and API calls are monitored by an API monitoring system including one or more of an API management module and an API monitoring module; actions further include simulating, by the simulation platform and after modification of the first extension application, production use of the service mesh at least partially by generating an updated set of frequencies of first API calls based on the call graph, the monitoring data, and the first cardinality, and displaying updated simulation results at least partially including the updated set of frequencies of the first API calls, the updated set of frequencies of the first API calls representing fewer API calls than represented in the set of frequencies of the first API calls; at least one extension application of the service mesh transmits electronic messages, the simulation results representing a number of electronic messages; and at least one extension application of the service mesh transmits cost-based API calls, the simulation results representing a number of cost-based API calls for determining a cost that would be incurred during production use of the service mesh.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a simulation platform to simulate and evaluate impacts of event-driven extensions in software systems. More particularly, implementations of the present disclosure are directed to a simulation platform that simulate impacts of event-driven extensions, which initiate cascading actions through application programming interface (API) calls across multiple software systems. In some implementations, the simulation platform processes event data and API monitoring data in combination with application process models and actual production data to generate and provide simulation results.

Implementations can include actions of generating, by a simulation platform of a development environment, a call graph at least partially representative of a service mesh including a set of software systems and a set of extension applications, the set of software systems including a first software system that is configured to publish a first event and a second software system configured to receive a set of first API calls, the set of extension applications including a first extension application configured to consume the first event and, in response to the first event, transmit the set of first API calls, determining, by the simulation platform, a first cardinality representative of a ratio of first events to first API-calls in the set of first API calls, receiving, by the simulation platform, monitoring data representative of one or more frequencies of the first event occurring during production use of the first software system, simulating, by the simulation platform, production use of the service mesh at least partially by generating a set of frequencies of first API calls based on the call graph, the monitoring data, and the first cardinality, and displaying simulation results at least partially including the set of frequencies of the first API calls.

To provide further context for implementations of the present disclosure, and as introduced above, modern software systems (also referred to as applications, or application programs) provided as a service (i.e., in a Software-as-a-Service (SaaS) approach) typically offer extensibility approaches that are stable over the lifecycle of the software system. For example, a software vendor that provides a software system can enable developers (e.g., customers of the software system) to provide extension applications that provide further functionality. In one variant, a software system can publish events and an extension application can consume the event and execute functionality based thereon. In this example, the extension applications can be referred to as event-driven extensions. Such extension applications can call APIs in the originating software system (i.e., the software system publishing an event) as well as other services (e.g., other extension applications), and can generate events themselves. This can result in a cascade of initiated actions across multiple software systems and extension applications. Typically, the cascaded actions are hard to overlook, especially if multiple extension applications are combined, as they depend on data not accessible to the developers of the extension applications.

In general, it is important for developers of extension applications to have an understanding of the performance impact and costs the functionality provided by an extension application will have in production use. This understanding can enable the developer to develop the extension application in a way that avoids adverse performance impact and costs (e.g., in terms of technical resources expended) when the extension application is deployed for production use. Typically, running a test of the functionality in a test environment can give a first idea on costs, but to derive actual costs for production use in the specific case can be very cumbersome, and might not be possible in all cases. Another aspect that is to be considered is user experience, and whether the extension application would result in a negative user experience in production. For example, if, in response to an event published by a software system, an extension application sends e-mails to customers, or calls APIs, which lead to e-mails to customers (e.g., a marketing campaign) it should be known, how many e-mails will be sent, and particularly, how many e-mails will be sent to the same customer. A case that would create a negative user experience could include individual customers being overwhelmed by a number of e-mails. Not only is this an annoyance to the individual customers, but is also a waste of technical resources (e.g., processors, memory, bandwidth) in sending the many e-mails.

In the context of extension applications, the typical approach of testing the application extension is problematic. For example, tests in a production environment are typically "local only" and do not span end-to-end processes. Even if an application contains test data, this data is rarely of the volume and association-cardinality of production data. Thus, an estimation of costs (e.g., financial, or technical in terms of technical resources expended) based on test results will be problematic. Also, the interdependencies of multiple application extensions is neglected although it may have dramatic impact on the overall result.

With regard to testing, few applications offer "test-operations" on production data (e.g., a "test-order" running the complete process through to sending a "test-invoice"). Especially in an application composed out of many services—including third-party services and application extensions—test runs on production data and processes are limited. For example, even if a full database is cloned and is used to run tests (i.e., to have real-life production data and enterprise configurations), the cloned database is fenced and requests are not sent out to other systems. Consequently, testing will be limited to dedicated test environments using dedicated test-data. However, such dedicated test environments are costly to set up and are limited to specific use cases being tested. Such dedicated test environments cannot be quickly or resource-efficiently retro-fitted for testing new integrated processes based on representative production data with representative production load and event frequency.

Figure 1:
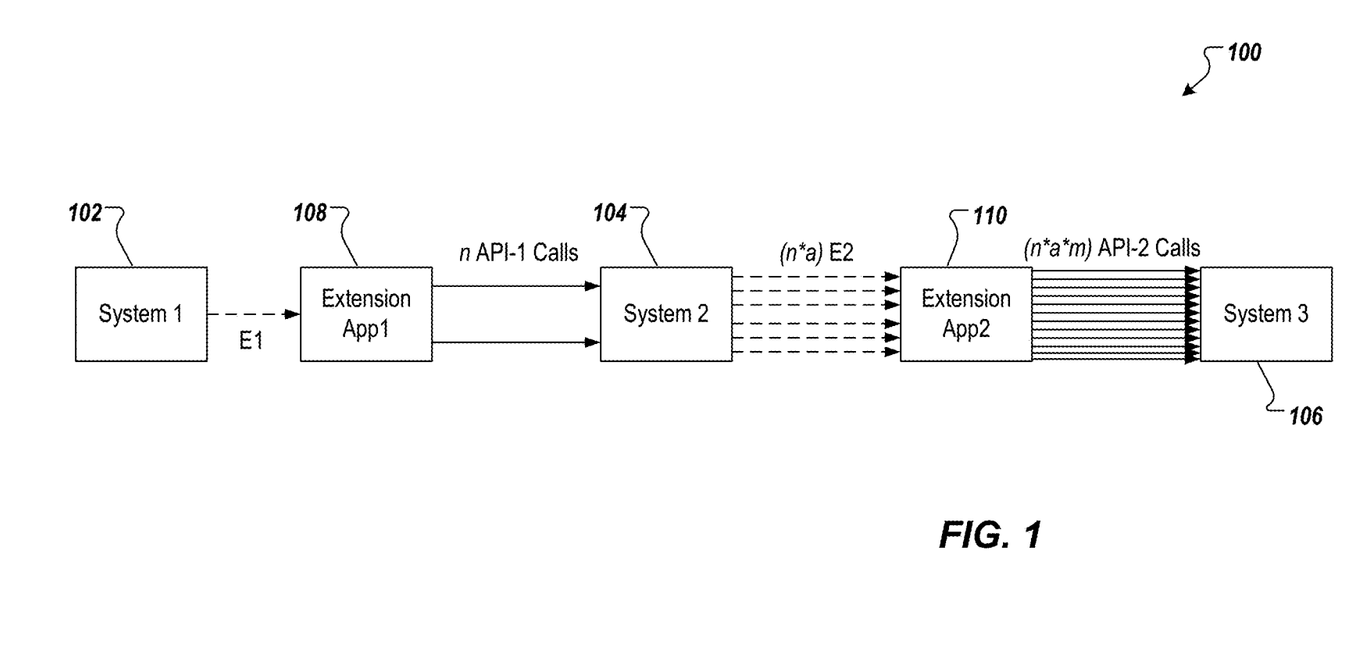
FIG. 1 depicts an example high-level architecture addressed by implementations of the present disclosure.

FIG. 1 depicts an example high-level architecture 100 addressed by implementations of the present disclosure. In the example of FIG. 1, the high-level architecture 100 includes a first software system 102, a second software system 104, a third software system 106, a first extension application 108, and a second extension application 110. In some examples, each of the first software system 102, the second software system 104, and the third software system 106 provides respective functionality. In some examples, each of the first extension application 108 and the second extension application 110 provides respective functionality that extends functionality provided by software systems. In the example of FIG. 1, the first extension application 108 extends functionality of the first software system 102 and the second extension application 110 extends functionality of the second software system 104. In some examples, extending functionality includes providing additional functionality in response to an event published by a software system.

In the example of FIG. 1, the first extension application 108 can listen to events published by the first software system 102 (e.g., in an event publish-subscribe paradigm). For example, the first software system 102 publishes a first event E1 and the first extension application 108, which subscribes to an event type of E1, receives E1. In response to E1, the first extension application 108 sends n first API (API-1) calls to the second software system 104, where n≥1 (e.g., n=2 in FIG. 1). In response to the n API-1 calls, the second software system 104 publishes a second events (E2s) for each of the n API-1 calls, where a≥1 (e.g., a=3 in FIG. 1). The second extension application 110 can listen to events published by the second software system 104 (e.g., in an event publish-subscribe paradigm). For example, the second software system 104 publishes the second event E2 and the second extension application 110, which subscribes to an event type of E2, receives E2. In response to each E2, the second extension application 110 sends m second API (API-2) calls to the third software system 106, where m≥1 (e.g., in m=2 FIG. 1).

As depicted in FIG. 1, one event published by the first software system 102, (e.g., E1) causes the third software system 106 to receive twelve (12) API-2 calls. This number of calls to the third software system 106 can exponentially increase when the values of n, m, and a increase. In some examples, the third software system 106 can further publish more events based on the calls. Consequently, the cascading effect depicted in FIG. 1 can carry on. As a result, the enormous amounts of API calls and/or events may be generated due to the cascading effect beginning with only one event generated from the first software system 102.

The situation can be worse when the software systems and the extension applications form a so-called "death spiral" through the events and the calls. For example, in an arrangement where the first software system 102 responds to the API-2 calls, rather than the third system 106, and the first software system 102 is configured to publish E1 in response to the API-2 calls, then the first system 102, the first extension application 108, the second software system 104, and the second extension application 110 would form a closed circle and keep publishing events or raise API calls.

This would have a very significant and adverse impact to the service performance and cost. Further, if one of the software systems or the extension applications includes processes related users (e.g., sending an e-mail to customers), the adverse impact would be compounded with a negative customer experience.

Accordingly, FIG. 1 depicts a cascading effect across multiple software systems that can result from a single event. The example of FIG. 1 depicts a cascading effect that, traditionally, cannot be readily and resource-efficiently evaluated in a test environment, as discussed above.

In view of the above context, and as introduced above, implementations of the present disclosure provide a simulation platform to simulate and evaluate impacts of event-driven extensions (also referred to herein as extension applications) in software systems. More particularly, implementations of the present disclosure are directed to a simulation platform that simulates impacts of event-driven extensions, which initiate cascading actions through API calls across multiple software systems, and/or other extension applications. In some implementations, the simulation platform processes event data and API monitoring data in combination with application process models and actual production data to generate and provide simulation results. In some examples, the simulation results are used to make changes to the extension application before deployment of the extension application to production.

As described in further detail herein, the simulation platform of the present disclosure provides a call graph, an extended model, and simulation statistics for evaluating an extension application prior to deployment of the extension application to production.

In some examples, a call graph of an extension application is computed to derive interdependencies between the extension application and software systems and/or other extension applications. For example, with increased use of events that are designed for decoupling components, there is no longer a central system (e.g., a Cloud Platform Integration) that stores and manages all of the dependencies between software systems and extension applications.

In view of this, implementations of the present disclosure provide a call graph that is constructed by monitoring events consumed by the extension application(s) and API calls generated by the extension application(s). In some examples, API targets (e.g., software systems receiving API calls) can be redirected by applications, such as an API management module. The API call made by the extension application in the simulation platform may reach a different software system in the production environment. In this case, configuration information in the API management module needs to read out to determine, which software system in the simulation is mapped to which software system(s) in the production environment.

In some examples, a gap in the call graph of the extension application may exist, if the relationship between the consumed event and the generated calls of the extension application (referred to as the cardinality of the extension application) is considered. In some examples, extended model information of the software systems identified in the call graph is also considered in the simulation platform. The extended model information of a software system includes a cardinality, which can be defined as a ratio between the responded calls and events generated based on the calls. In other words, for the software systems identified in the call graph of the extension application, what API calls will result in publication of which events are recorded as the extended model information of the software system. As a result, a route from the first event consumed by the extension application to the final API calls or events generated in the cascading actions can be identified.

In some implementations, and with regard to collection of simulation statistics, monitoring data from both the test (or development) environment and the production environment is used to compute the call graph, as noted above. The monitoring data is also used to generate statistical data that is used in combination with extended model information of the software systems to provide simulation results, as described herein. In general, and as described in further detail herein, the call graph of the extension application is the framework processed by the simulation platform, and the statistical data (derived from monitoring in the test and production environments) and the extended model information of the software system are processed through the call graph to provide simulation results.

Figure 2:
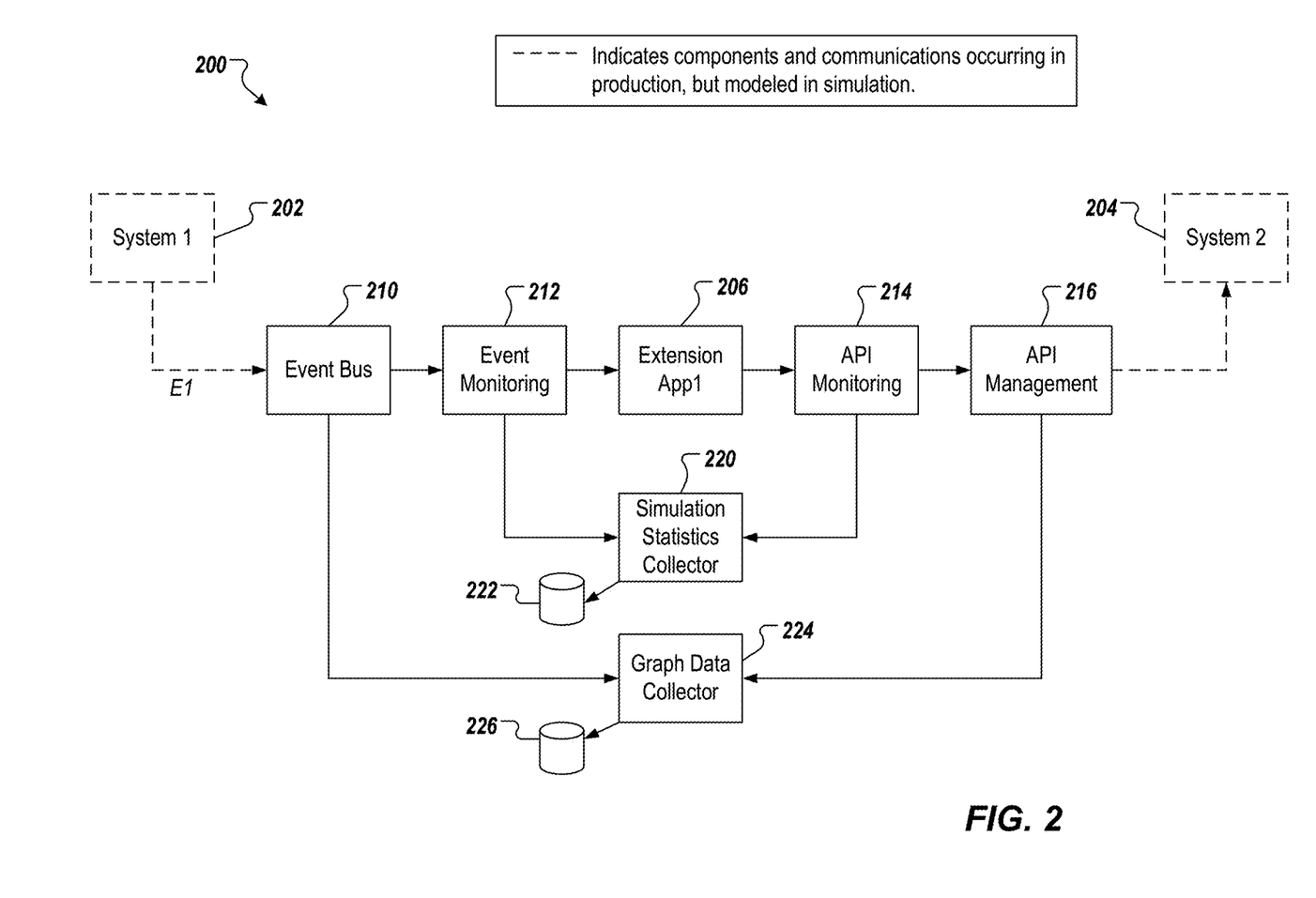
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a first software system 202, a second software system 204, and a first extension application 206. For example, the first software system 202 can publish an event having an event type that the first extension application 206 subscribed to, and in response to which, the first extension application 206 sends one or more API calls to the second software system 204.

In the example of FIG. 2, the example conceptual architecture 200 includes an event bus 210, an event monitoring module 212, an API monitoring module 214, and an API management module 216. In some examples, the event bus 210 is a bus for publication of events generated by software systems, such as the first software system 202 during production. The event monitoring module 212 monitors the event bus 210 in the production environment and records, which events are published by the first software system 202 and how frequently each event is published, as described in further detail herein. In this manner, during production execution of the first software system 202, monitoring data is recorded by the event monitoring module 212, the monitoring data representing events published by the first software system 202 (e.g., a first event (E1)). In some examples, the monitoring data includes, but is not limited to identification (ID) of the published events, the software system that published the event (e.g., the first software system 202), the event types of the published events, and frequencies of the published events. In some examples, frequency includes, but is not limited to, an average frequency (e.g. average frequency of one day or one week), a maximum (peak) frequency (e.g. the hour with the most publications in one day), a median frequency, and a minimum frequency.

In some examples, the first extension application 206 is the extension application under development and that is to be simulated using the simulation platform of the present disclosure before production use. The first extension application 206 is configured to listen to the event bus 210, receive and consume events that the first extension application 206 is subscribed to. For example, by design, the first extension application 206 is to subscribe to events, such as E1. Consequently, monitoring data for events published by the first software system 202 during production can be used in simulation as events that the first extension application 206 would consume, if put into production.

In some examples, in response to a consumed event, the first extension application 206 sends one or more API is designed to send one or more API calls to the second software system 204. For example, if, in production, the first extension application 206 were to consume E1 published by the first software system 202, the first extension application would, in response, send an API call through the API management module 216 to the second software system. During simulation, and as described in further detail herein, the API monitoring module 214 monitors and record one or more API calls sent from the first extension application 206. The monitoring data from the API monitoring module 214 includes, but is not limited to, identification (ID) of each call, the target software system of each call (e.g., the second software system 204), and frequency of the calls.

In some implementations, the monitoring data of the consumed events and the generated calls can also be derived from a software development kit (SDK) in the test/development environment (e.g., a library used by the extension application in the SDK). In some implementations, the extension application can generate events based on the consumed event and publish the events through the event bus 210. The event monitoring module 212 can also monitor these events generated by the extension application and mark the events as the outgoing events. In some examples, outgoing events can also be considered in downstream statistical calculations.

In the example of FIG. 2, the example conceptual architecture 200 includes a simulation statistics collector 220 with respective datastore 222 and a graph data collector 224 with respective datastore 226. In some examples, the simulation statistics collector 220 communicates with the event monitoring module 212 and the API monitoring module 214. The simulation statistics collector 220 receives monitoring data, from the event monitoring module 212, of published events that would be consumed by the first extension application 206 in production. The simulation statistics collector 220 receives, from the monitoring module 214, the API calls that the first extension application 206 generates in response to the published events during simulation. The simulation statistics collector 220 stores the monitoring data and calculates the cardinality of the first extension application 206 based thereon. In some examples, the cardinality of the first extension application 206 includes a ratio between the consumed events and the API calls based on the consumed events during simulation.

In some implementation, the simulation statistics collector 220 reads the extended model information of the software systems from the respective software systems. The extended model information of the software systems includes cardinality of each software system and the cardinality of each software system includes a ratio between the responded calls and events generated based on the calls. The extended model information of the software systems can be stored in the datastore 222 for use in the simulation platform.

The graph data collector 224 receives data from the event bus 210 and the API management module 216. The graph data collector 224 reads event subscription information from the event bus 210 (e.g., the first extension application 206 subscribes for event type regarding the first event E1). The graph data collector 224 also reads configuration information (or API hub information) stored in the API management module 216 to map the target software systems for respective API calls. From the event subscription information and API hub information, the graph data collector 224 can determine, which extension applications (or software systems) have subscribed to which events, and which APIs or API calls are provided by which software systems or extension applications. In this manner, for the extension application to be tested (e.g., the first extension application 206), the graph data collector 224 can generate a call graph for the first extension application 206 based on the events subscribed by the first extension application 206 and the API calls that would be generated by the first extension application 206 in response to the events. The call graph for the first extension application 206 can also be stored in the datastore 226. The example high-level architecture 100 is representative of a call graph that can be generated in accordance with implementations of the present disclosure.

Figure 3A:
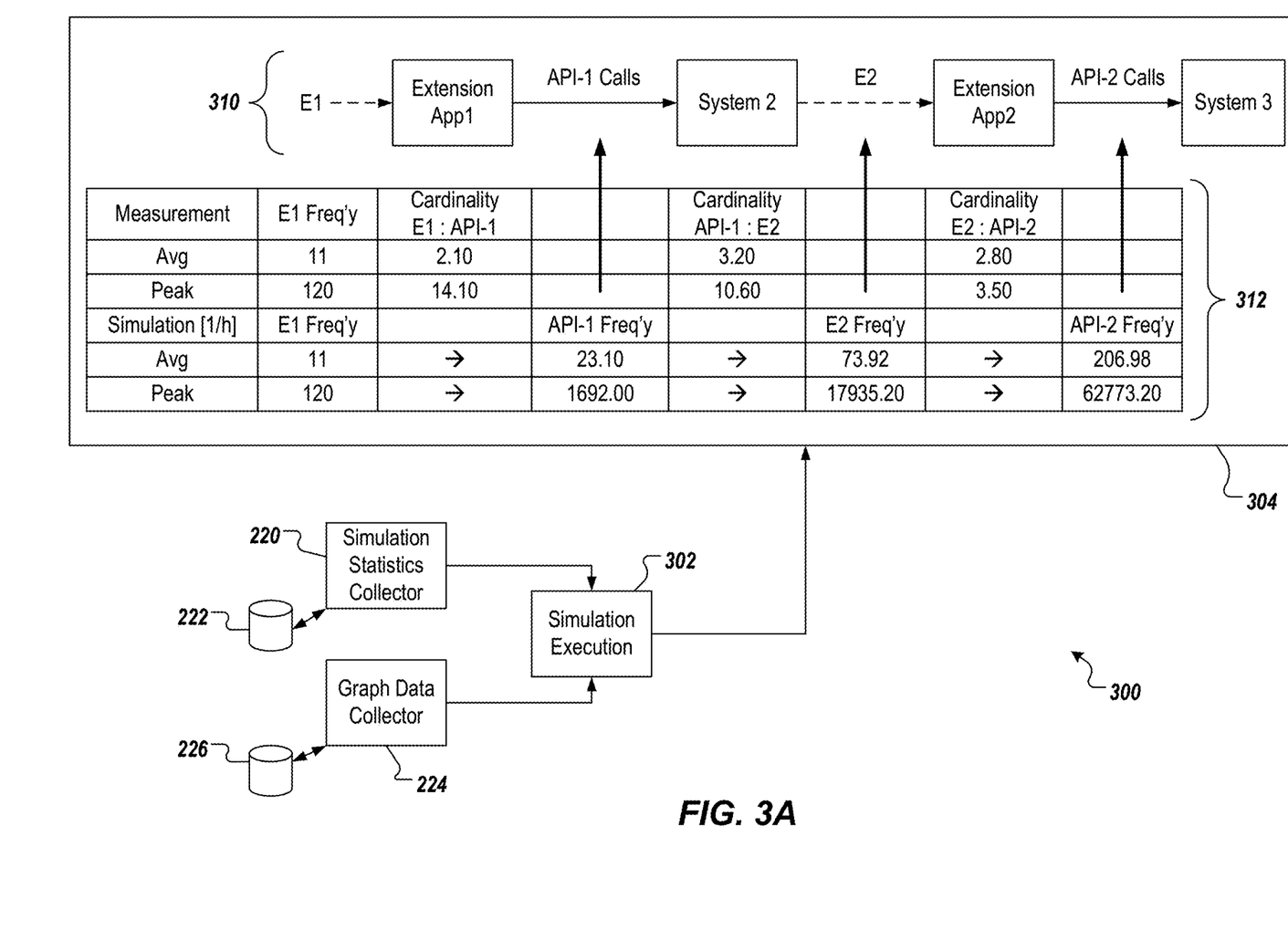
FIGS. 3A and 3B depict an example simulation platform in accordance with implementations of the present disclosure.
Figure 3B:
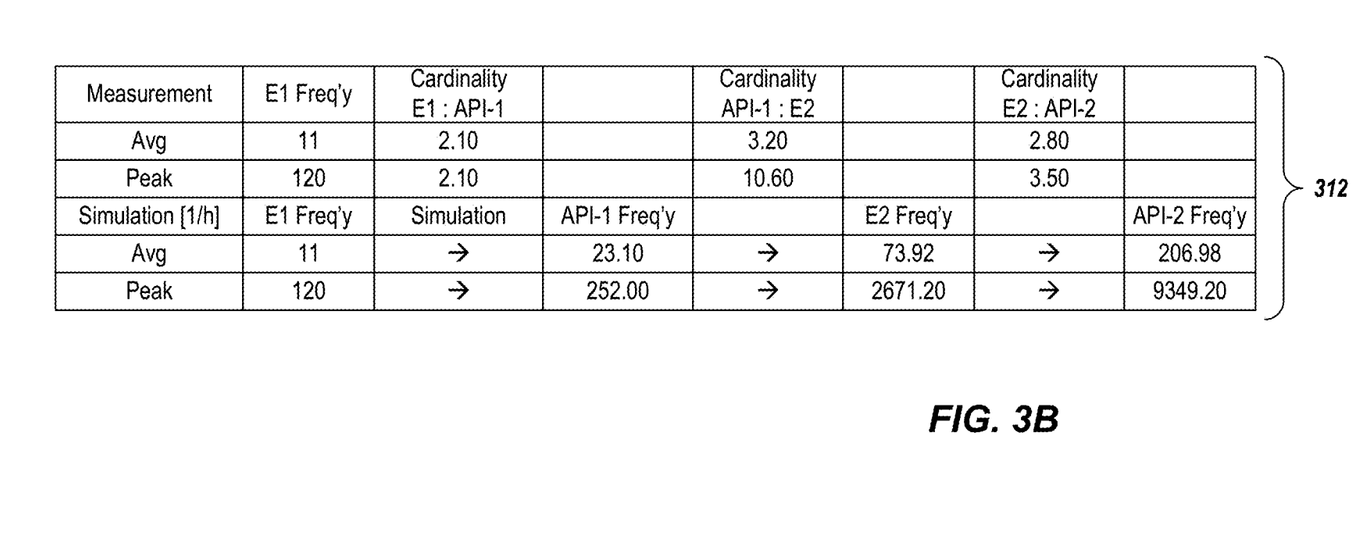

FIGS. 3A and 3B depict an example simulation platform 300 in accordance with implementations of the present disclosure. In the example of FIG. 3, the example simulation platform 300 includes a simulation execution engine 302 and a user interface (UI) 304. In some implementations, the example simulation platform 300 also includes the simulation statistics collector 220 and respective datastore 222 and the graph data collector 224 and respective datastore 226.

In the example of FIG. 3A, the UI 304 is configured for presenting simulation results and includes a system visualization 310 and a table 312. The system visualization 310 depicts a portion of the example of FIG. 1 and is representative of a call graph for the extension application(s) that are being evaluated (e.g., the first extension application 206 of FIG. 2). The table 312 depicts example simulation results output by the simulation execution engine 302, which includes the result of the cascading actions due to the interdependencies between the extension application, software systems, and other extension applications.

In some examples, the simulation is run in multiple stages. In a first stage, the simulation execution engine 302 computes a call graph using data from the graph data collector 224 and respective datastore 226. In the second stage, the simulation execution engine 302 calculates the simulation results based on data from simulation statistics collector 220 and respective data store 222 with the call graph generated in the first stage.

In further detail, at the first stage of the simulation, an extension application is selected for simulation (e.g., the first extension application 206 of FIG. 2). Based on the consumed event(s) of the extension application (e.g., E1) and generated API calls (e.g., API-1 calls), the simulation execution engine 302 derives the call graph representative of the extension application based on the data stored in the graph data collector 224 and respective datastore 226. In this manner, the call graph is developed and is visualized as the system visualization 310. In the system visualization 310, the first extension application consumes E1 and generates API-1 calls. A software system receives the API-1 calls and publishes a second event (E2). In the depicted example, a second extension application consumes E2 and generates API-2 calls in response. A third software system receives the API-2 calls without generating further events or making other API calls.

The call graph sets up the framework of the second stage of simulation, during which statistical data can be poured into the framework to generate the simulation results. For example, at the second stage, the simulation execution engine 302 reads the cardinality of each software system and extension application in the call graph. In the example of FIG. 3A, the cardinality of E1:API-1 is 2.10 on average and 14.10 during peak times, which indicates that, on average, 2.10 API-1 calls are made in response to each publication of E1, and, at peak, 14.10 API-1 calls are made in response to each publication of E1. In the example of FIG. 3A, the cardinality of API-1:E2 is 3.20 on average and 10.60 during peak times, which indicates that, on average, 3.20 E2s are published in response to each received API-1 call, and, at peak, 10.6 E2s are published in response to each received API-1 call. In the example of FIG. 3A, the cardinality of E2:API-2 is 2.80 on average and 3.50 during peak times, which indicates that, on average, 2.80 API-2 calls are made in response to each publication of E2, and, at peak, 3.50 API-1 calls are made in response to each publication of E2.

In the example of FIG. 3A, the statistical data includes an average frequency and a peak frequency for E1, which are determined during production execution of the software system(s) publishing E1 (e.g., the first software system 202 of FIG. 2). During simulation, the average and peak frequency of the initial event (e.g., E1) are read and, for each node in the call graph (i.e., extension applications, software systems), respective cardinalities are multiplied with frequencies of the preceding node. For example, the peak frequency of E1 (e.g., peak frequency of E1 in one hour) is 120 and the cardinality regarding the peak frequency of the first extension application is 14.10. Consequently, the peak frequency of the API-1 calls would be 1692.00, and so on. In the example of FIG. 3A, a cascade where the average numbers are multiplied and the peak numbers are multiplied is observed. For each node in the call graph, the average and peak frequency can thus be determined. It can be observed from the table 312 that the average/peak frequency of 11/120 numbers of E1 results in average/peak frequency of 206.98/62773.20 numbers of API-2 calls due to the cascading actions if the first extension application is deployed in production use.

In the example shown in FIG. 3A, through the information shown in UI 304, the developer could identify that the peak cardinality of the first extension application (E1:API-1=14.10) leads to very high call rates of the second software system and later to an extremely high call rates of the third software system. In view of this, it can be determined that, prior to deployment to production, the first extension application can be modified to lower its cardinality (e.g., simplify the inner process or adjusting conditions for API calls). A simulation can be rerun to evaluate revisions made to the extension application.

FIG. 3B depicts the table 312 of FIG. 3A with updated simulation results. In this example, the first extension application can be modified in response to the simulation results depicted in FIG. 3A. In this example, the cardinality E1:API-1 for the peak frequency is reduced from 14.10 to 2.10. As a result, the peak frequency of the API-2 calls that ultimately result is reduced from 62773.20 to 9349.20. In this manner, a significant reduction of technical resources that would have otherwise been consumed to send and response to the API-2 calls is achieved and potential for user frustration is mitigated.

Figure 4:
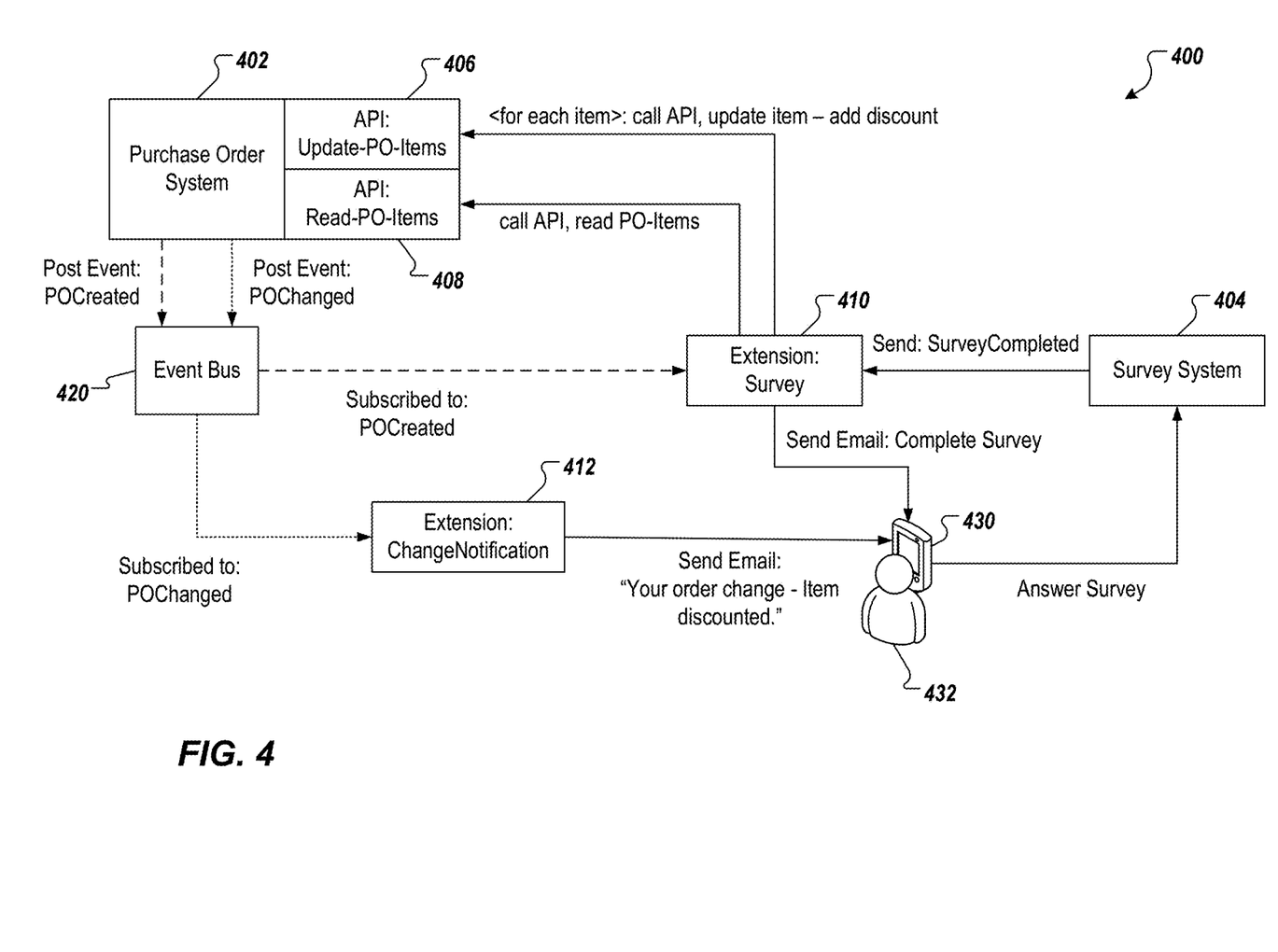
FIG. 4 depicts a first example use case to illustrate implementations of the present disclosure.

FIG. 4 depicts a first example use case to illustrate implementations of the present disclosure. In the example of FIG. 4, a service mesh 400 is depicted. In some examples, the service mesh 400 is a to-be-evaluated service mesh, which includes at least one extension application that is under development (i.e., not yet deployed to production). In this example, an extension application, the extension application "survey" 410 of a purchase order system 402, is created by a developer. Namely, the developer (e.g., who is a customer of the purchase order system 402) would like to build an extension application that starts a survey after every completed purchase in their online shop and when the survey is completed, the buyer receives a discount on all product items of the order.

In this example, when a purchase is made in the purchase order system 402, the purchase order system 402 would publish/post an event "POCreated" to the event bus 420. The extension application "survey" 410 subscribes to the event "POCreated" and when the extension application "survey"

410 consumes the event "POCreated," the extension application "survey" 410 would generate a API call to call the "Read-PO-Items" API 408 of the purchase order system 402 to read the information regarding the purchased items in the order. After receiving the information regarding the purchased items, the extension application "survey" 410 would be triggered to send an e-mail for survey to a mobile device 430 of the buyer 432 of the purchased items. A survey system 404 would send a "survey completed" message (which could be an event or an API call), if the buyer 432 finishes the survey. When the extension application "survey" 410 receives the "survey completed" message, the extension application "survey" 410 generates calls to the "Update-PO-Items" API 406 to add discounts to each of the purchased item. It is noted that in order to add discounts to each purchased item, a number of API calls are made.

In this example, it may not be noticed by the developer of the extension application "survey" 410 that, when prices of the purchased items are updated (i.e., adding discounts), the purchase order system 402 would correspondingly publish a "POChanged" event through the event bus 420. Another extension application "ChangeNotification" 412, which has been deployed in the production environment, subscribes to the "POChanged" event. The extension application "ChangeNotification" 412 was intended for updates, such as delayed or canceled items. However, the extension application "ChangeNotification" 412 listens to the "POChanged" event and sends an email to the mobile device 430 of the buyer 432 due to the discounts made to the purchased items.

If both of the extension applications are combined in the production environment, an unintended behavior would be created. That is, in this example, the buyer is spammed with emails reporting order updates one product line item after the other. So, for example, an order with 20 products purchased would cause 20 emails regrading updates sent after the survey was completed and discounts are applied. Such unintended behavior could be detected by running a simulation using the simulation platform of the present disclosure before the extension application "survey" 410 is deployed into the production. In view of the simulation results, the extension application that sends order update notifications (i.e., the extension application "ChangeNotification" 412) can be modified, for example, to aggregate order changes over a short period of time (e.g., 5 or 10 seconds) and then send only one combined email describing all of the changes together. As the extension application "survey" 410 applies the discounts in a short sequence, all changes made by the extension application "survey" 410 would fall in this short aggregation period of the modified extension application "ChangeNotification" 412. In this manner, the undesired behavior of combining the two extension applications detected during development (i.e., as a result of the simulation) is avoided in production.

Figure 5:
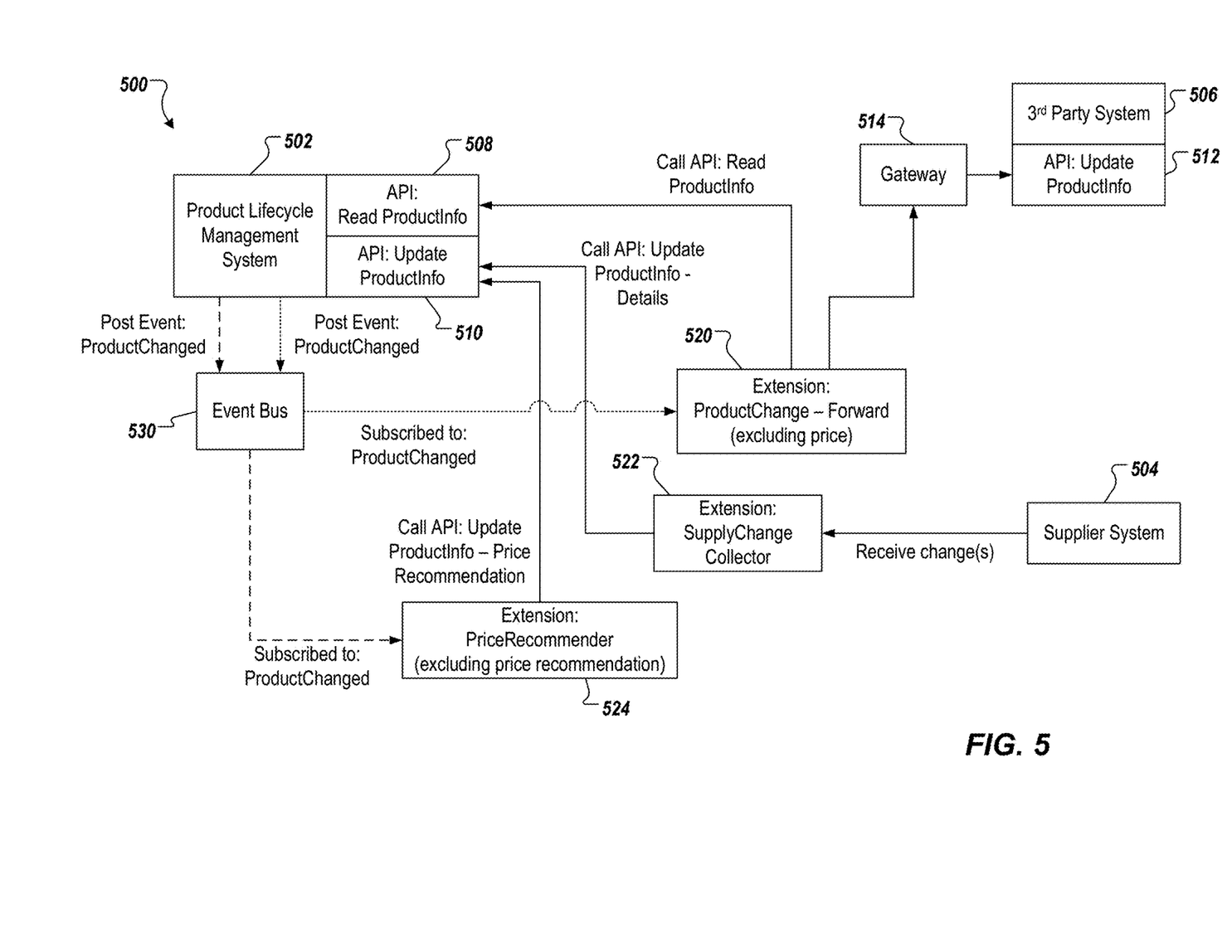
FIG. 5 depicts a second example use case to illustrate implementations of the present disclosure.

FIG. 5 depicts a second example use case to illustrate implementations of the present disclosure. In the example of FIG. 5, a service mesh 500 is depicted. In some examples, the service mesh 500 is a to-be-evaluated service mesh, which includes at least one extension application that is under development (i.e., not yet deployed to production). In this example, an extension application "ProductChange-Forward" 520 is built for production information stored in a third-party system 506. As an implementation, the extension application "ProductChange-Forward" 520 listens to "ProductChanged" events created by the product lifecycle management system 502 through the event bus 530. If a "ProductChanged" event is published, the extension application "ProductChange-Forward" 520 would initiate calls to "Read ProductInfo" API 508 to read the changed product mentioned in the "ProductChanged" event. Then, the extension application "ProductChange-Forward" 520 is able to send the information regarding product changes to the third-party system 506. In this example, the information can be sent through a gateway 514 (e.g., a gateway service in SAP Open Connectors). The third-party system 506 can update the product record of the changed product based on the information sent by the extension application "ProductChange-Forward" 520.

It can be noted that, in this example, because the third-party system 506 does not require pricing information of the changed products, the price changes of the products are filtered by the extension application "ProductChange-Forward" 520 and only other changes (e.g., changes on material number, description) are sent through the gateway 514. It is also noted that, in this example, each single call to the gateway 514 service incurs cost (e.g., financial, as well as technical resources to make the call). However, as changes to the relevant attributes (e.g., changes other than the price changes) are rare, so the cost may not be a problem for the developer of the extension application "ProductChange-Forward" 520.

Further, the developer builds a second extension application "SupplyChangeCollector" 522 that fetches pricelist information from the suppliers (on a daily basis, for example). Namely, the extension application "SupplyChangeCollector" 522 may receive messages regarding changes (which could be events or API calls) from the supplier system 504. In response, API calls are made to the "Update ProductInfo" API 510 to update the product information (e.g., the pricelist information regarding the product from the suppliers) in the product lifecycle management system 502. When the product lifecycle management system 502 updates price information of the products, the updates would also trigger the product lifecycle management system 502 to publish "ProductChanged" events. Because the extension application "ProductChange-Forward" 520 filters out the information regarding price changes, no additional calls to the gateway 514 result from the extension application "SupplyChangeCollector" 522.

In this example, a third extension application "PriceRecommender" 524 listens to product changed events and calculates an extension attribute "price recommendation" based on changes in the price of a product. It updates the information regarding products with the newly determined "price recommendation" attribute. This again triggers a "ProductChanged" event, to which the first extension application "ProductChange-Forward" 520 listens. The "ProductChanged" event triggered by the extension application "PriceRecommender" 524 includes attributes related to price (the "price recommendation") rather the price of products itself. In response, the first extension application "ProductChange-Forward" 520 would send an update to the third-party system 506 through the gateway 514. As a consequence, the number of calls to the gateways 514 significantly increases and unexpected cost and expenditure of technical resources would result.

To detect such a cascading effect, simulation is made before deployment in the production environment. In response to the simulation results, and as an example remedy, the first extension application "ProductChange-Forward" 520 could be modified to filter and exclude the "price recommendation" to avoid unnecessary calls to the gateway 514.

Figure 6:
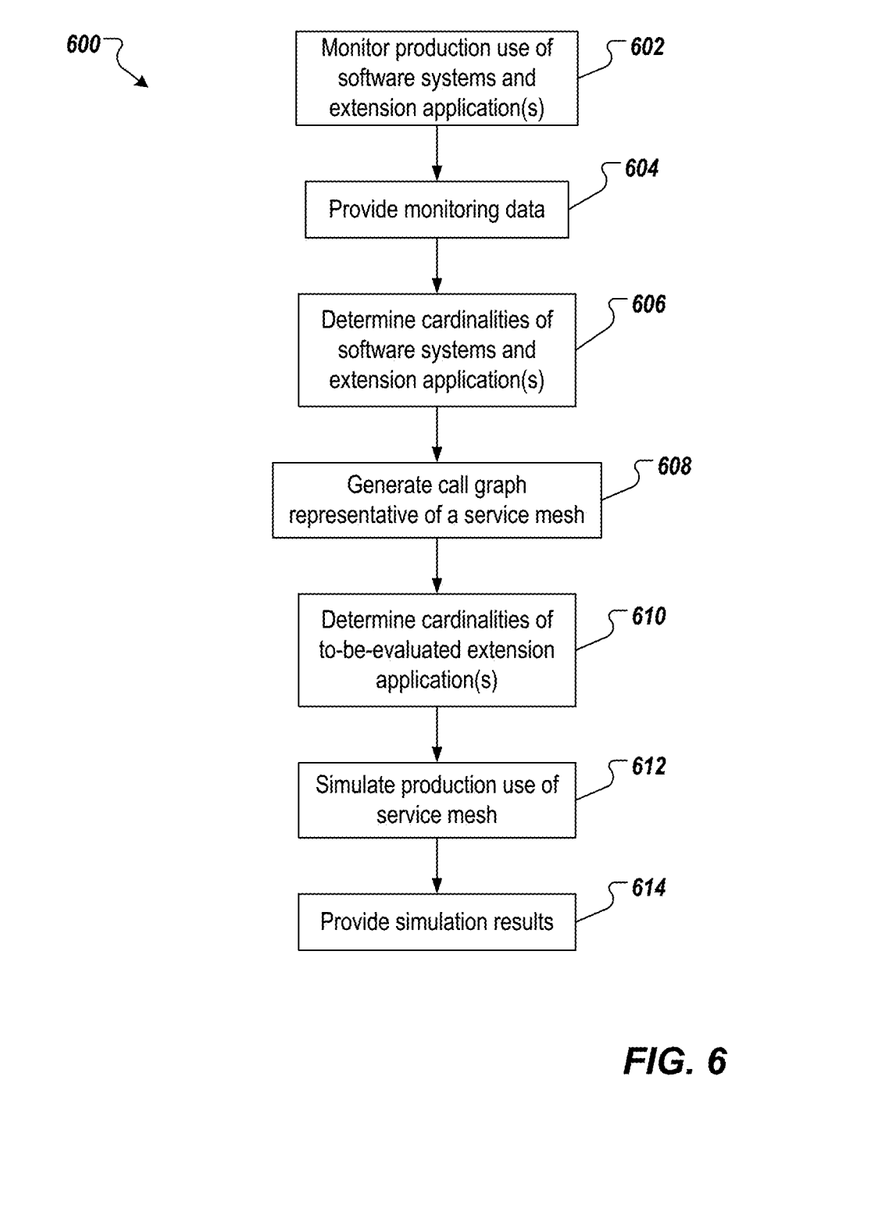
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

Production use of software systems and one or more extension applications is monitored (602) and monitoring data is provided (604). In some examples, the software systems and one or more extension applications are provided in an initial service mesh that represents operation of the software systems and one or more extension applications in production. In some examples, the monitoring data includes events published by each of the software systems and API-calls transmitted by each of the extension applications. As described herein, events can be monitored by an event monitoring system (e.g., the event bus 210 and/or the event monitoring module 212 of FIG. 2), and API calls are monitored by an API monitoring system (e.g., the API management module 216 and/or the API monitoring module 214 of FIG. 2). In some examples, at least a portion of the monitoring data (e.g., frequencies of events, frequencies of API calls) is provided to the simulation statistics collector 220 of FIG. 2, and at least a portion of the monitoring data (e.g., which software systems publish which events, which software systems receive which events, which extension applications subscribe to which events, and which extension applications transmit which API calls) is provided to the graph data collector 224 of FIG. 2.

Cardinalities of software systems and extension applications of the initial service mesh are determined (606). For example, for at least one extension application, the simulation statistics collector 220 of FIG. 2 processes a frequency of events and a frequency of API calls transmitted by the extension application in response to an event to determine a cardinality as a ratio of events to API calls. That is, the number of API calls that the extension application transmits in response to an event. As another example, for at least one software system, the simulation statistics collector 220 of FIG. 2 processes a frequency of API calls received by and a frequency of events published by the software system in response to an API call to determine a cardinality as a ratio of API calls to events. That is, the number of events the software system publishes in response to an API call.

A call graph representative of a to-be-evaluated service mesh is generated (608). In some examples, the to-be-evaluated service mesh includes the software systems and extension application(s) of the initial service mesh (e.g., the service mesh already existing in production) and includes one or more extension applications that are to be evaluated (i.e., extension applications under development that are to be deployed to production). For example, and with reference to FIG. 4, an initial service mesh is absent the extension application "survey" 410, because the extension application "survey" 410 is under development and not yet deployed to production. To simulate any cascading effect that would result from deploying the extension application "survey" 410 to production, a call graph is generated that represents the extension application "survey" 410 integrated into the initial service mesh to provide a to-be-evaluated service mesh.

In some examples, the simulation execution engine 302 of FIGS. 3A and 3B generates the call graph based on at least a portion of the monitoring data (e.g., which software systems publish which events, which software systems receive which events, which extension applications subscribe to which events, and which extension applications transmit which API calls) and specifications of the extension application(s) that are under development. In some examples, the specifications indicate, which events each extension application subscribes to and which API calls each extension application transmits in response to an event. Cardinalities of the to-be-evaluated extension application(s) are determined (610). For example, the simulation execution engine 302 of FIGS. 3A and 3B based on specifications of the to-be-evaluated extension application(s). In some examples, the specifications indicate, for each extension application, one or more cardinalities representing respective ratios of events to API calls (i.e., the number of API calls a respective extension application will transmit in response to an event).

Production use of the to-be-evaluated service mesh is simulated (612) and simulation results are provided (614). For example, and as described herein with reference to FIGS. 3A and 3B, the call graph can be processed in view of monitoring data (e.g., frequencies of events, frequencies of API calls), cardinalities, and the call graph to generate the simulation results. In some examples, the simulation results are displayed to enable a developer to evaluate a cascading effect of the extension application(s) prior to deployment to production.

Figure 7:
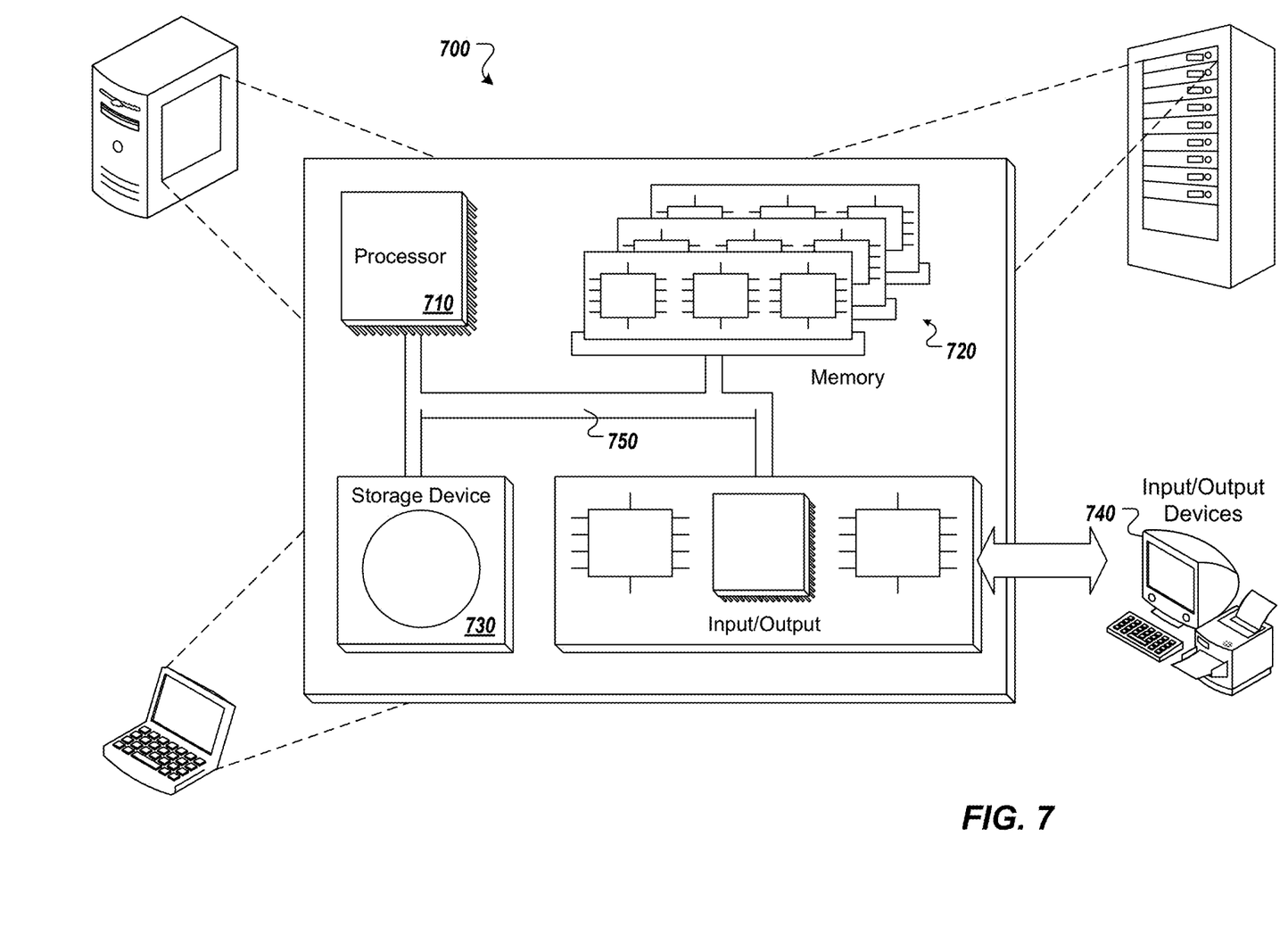
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for simulating cascading effects within service meshes, the computer-implemented method being executed by one or more processors and comprising:
   generating, by a simulation platform of a development environment, a call graph at least partially representative of a service mesh comprising a set of software systems and a set of extension applications, wherein the set of software systems comprise a first software system that is configured to publish a first event and a second software system that is configured to receive a set of first application programming interface (API) calls, and wherein the set of extension applications comprise a first extension application that is configured to consume the first event and, in response to the first event, transmit the set of first API calls;
   determining, by the simulation platform of the development environment, a first cardinality of the first software system and which is representative of a ratio of first events to first API calls in the set of first API calls;
   receiving, by the simulation platform of the development environment, monitoring data representative of one or more frequencies of the first event occurring during production use of the first software system;
   simulating, by the simulation platform of the development environment, production use of the service mesh at least partially by generating a set of frequencies of the first API calls based on the call graph, the monitoring data, and the first cardinality of the first software system; and
   displaying simulation results at least partially comprising the set of frequencies of the first API calls.

2. The computer-implemented method of claim 1, further comprising determining model information of the second software system, wherein the model information of the second software system comprises a second cardinality of the second software system and which is representative of a ratio of second events published by the second software system to the first API calls received by the second software system during production use of the second software system, and wherein simulating, by the simulation platform of the development environment, production use of the service mesh further comprises generating a set of frequencies of second events based on the call graph, the monitoring data, and the second cardinality of the second software system.

3. The computer-implemented method of claim 1, further comprising:
   monitoring, during production use, events published by and API calls received by one or more of the first software system and the second software system; and
   generating the monitoring data based on the published events and the received API calls for use in simulations.

4. The computer-implemented method of claim 3, wherein the published events are monitored by an event monitoring system comprising one or more of an event bus and an event monitoring module, and the received API calls are monitored by an API monitoring system comprising one or more of an API management module and an API monitoring module.

5. The computer-implemented method of claim 1, further comprising:
   simulating, by the simulation platform of the development environment and after modification of the first extension application, production use of the service mesh at least partially by generating an updated set of frequencies of the first API calls based on the call graph, the monitoring data, and the first cardinality of the first software system; and displaying updated simulation results at least partially comprising the updated set of frequencies of the first API calls, wherein the updated set of frequencies of the first API calls represent fewer API calls than represented in the set of frequencies of the first API calls.

6. The computer-implemented method of claim 1, wherein at least one extension application of the service mesh transmits electronic messages, and wherein the simulation results represent a number of electronic messages.

7. The computer-implemented method of claim 1, wherein at least one extension application of the service mesh transmits cost-based API calls, and wherein the simulation results represent a number of cost-based API calls for determining a cost that would be incurred during production use of the service mesh.

8. A non-transitory computer-readable storage medium coupled to one or more processors and having instructions stored thereon which, when executed by the one or more processors, cause the one or more processors to perform operations for simulating cascading effects within service meshes, the operations comprising:

generating, by a simulation platform of a development environment, a call graph at least partially representative of a service mesh comprising a set of software systems and a set of extension applications, wherein the set of software systems comprise a first software system that is configured to publish a first event and a second software system that is configured to receive a set of first application programming interface (API) calls, and wherein the set of extension applications comprise a first extension application that is configured to consume the first event and, in response to the first event, transmit the set of first API calls;

determining, by the simulation platform of the development environment, a first cardinality of the first software system and which is representative of a ratio of first events to first API calls in the set of first API calls;

receiving, by the simulation platform of the development environment, monitoring data representative of one or more frequencies of the first event occurring during production use of the first software system;

simulating, by the simulation platform of the development environment, production use of the service mesh at least partially by generating a set of frequencies of the first API calls based on the call graph, the monitoring data, and the first cardinality of the first software system; and displaying simulation results at least partially comprising the set of frequencies of the first API calls.

9. The non-transitory computer-readable storage medium of claim 8, wherein the operations further comprise determining model information of the second software system, wherein the model information of the second software system comprises a second cardinality of the second software system and which is representative of a ratio of second events published by the second software system to the first API calls received by the second software system during production use of the second software system, and wherein simulating, by the simulation platform of the development environment, production use of the service mesh further comprises generating a set of frequencies of second events based on the call graph, the monitoring data, and the second cardinality of the second software system.

10. The non-transitory computer-readable storage medium of claim 8, wherein the operations further comprise:

monitoring, during production use, events published by and API calls received by one or more of the first software system and the second software system; and generating the monitoring data based on the published events and the received API calls for use in simulations.

11. The non-transitory computer-readable storage medium of claim 10, wherein the published events are monitored by an event monitoring system comprising one or more of an event bus and an event monitoring module, and the received API calls are monitored by an API monitoring system comprising one or more of an API management module and an API monitoring module.

12. The non-transitory computer-readable storage medium of claim 8, wherein the operations further comprise:

simulating, by the simulation platform of the development environment and after modification of the first extension application, production use of the service mesh at least partially by generating an updated set of frequencies of the first API calls based on the call graph, the monitoring data, and the first cardinality of the first software system; and displaying updated simulation results at least partially comprising the updated set of frequencies of the first API calls, wherein the updated set of frequencies of the first API calls represent fewer API calls than represented in the set of frequencies of the first API calls.

13. The non-transitory computer-readable storage medium of claim 8, wherein at least one extension application of the service mesh transmits electronic messages, and wherein the simulation results represent a number of electronic messages.

14. The non-transitory computer-readable storage medium of claim 8, wherein at least one extension application of the service mesh transmits cost-based API calls, and wherein the simulation results represent a number of cost-based API calls for determining a cost that would be incurred during production use of the service mesh.

15. A system comprising:

a computing device comprising one or more processors; and a non-transitory computer-readable storage medium coupled to the computing device and having instructions stored thereon which, when executed by the computing device, cause the computing device to perform operations for simulating cascading effects within service meshes, the operations comprising:

generating, by a simulation platform of a development environment, a call graph at least partially representative of a service mesh comprising a set of software systems and a set of extension applications, wherein the set of software systems comprise a first software system that is configured to publish a first event and a second software system that is configured to receive a set of first application programming interface (API) calls, and wherein the set of extension applications comprise a first extension application that is configured to consume the first event and, in response to the first event, transmit the set of first API calls;

determining, by the simulation platform of the development environment, a first cardinality of the first software system and which is representative of a ratio of first events to first API calls in the set of first API calls;

receiving, by the simulation platform of the development environment, monitoring data representative of one or more frequencies of the first event occurring during production use of the first software system;

simulating, by the simulation platform of the development environment, production use of the service mesh at least partially by generating a set of frequencies of the first API calls based on the call graph, the monitoring data, and the first cardinality of the first software system; and displaying simulation results at least partially comprising the set of frequencies of the first API calls.

16. The system of claim 15, wherein the operations further comprise determining model information of the second software system, wherein the model information of the second software system comprises a second cardinality of the second software system and which is representative of a ratio of second events published by the second software system to the first API calls received by the second software system during production use of the second software system, and wherein simulating, by the simulation platform of the development environment, production use of the service mesh further comprises generating a set of frequencies of second events based on the call graph, the monitoring data, and the second cardinality of the second software system.

17. The system of claim 15, wherein the operations further comprise:

monitoring, during production use, events published by and API calls received by one or more of the first software system and the second software system; and generating the monitoring data based on the published events and the received API calls for use in simulations.

18. The system of claim 17, wherein the published events are monitored by an event monitoring system comprising one or more of an event bus and an event monitoring module, and the received API calls are monitored by an API monitoring system comprising one or more of an API management module and an API monitoring module.

19. The system of claim 15, wherein the operations further comprise:

simulating, by the simulation platform of the development environment and after modification of the first extension application, production use of the service mesh at least partially by generating an updated set of frequencies of the first API calls based on the call graph, the monitoring data, and the first cardinality of the first software system; and displaying updated simulation results at least partially comprising the updated set of frequencies of the first API calls, wherein the updated set of frequencies of the first API calls represent fewer API calls than represented in the set of frequencies of the first API calls.

20. The system of claim 15, wherein at least one extension application of the service mesh transmits electronic messages, and wherein the simulation results represent a number of electronic messages.

\* \* \* \* \*